US012224928B1

(12) United States Patent
Ashlock et al.

(10) Patent No.: US 12,224,928 B1
(45) Date of Patent: Feb. 11, 2025

(54) NETWORK PATH PROBING WITH ENERGY SOURCE IDENTIFICATION

(71) Applicant: Cisco Technology, Inc., San Jose, CA (US)

(72) Inventors: Hans Ashlock, Berkeley, CA (US); Indermeet Singh Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/244,964

(22) Filed: Sep. 12, 2023

(51) Int. Cl.
*G06F 15/173* (2006.01)
*H04L 43/045* (2022.01)
*H04L 43/12* (2022.01)
*H04L 45/12* (2022.01)
*H04L 45/42* (2022.01)

(52) U.S. Cl.
CPC .......... *H04L 45/123* (2013.01); *H04L 43/045* (2013.01); *H04L 43/12* (2013.01); *H04L 45/42* (2013.01)

(58) Field of Classification Search
CPC ...................................................... H04L 43/12
See application file for complete search history.

(56) References Cited

U.S. PATENT DOCUMENTS

| | | | |
|---|---|---|---|
| 8,949,050 B2 | 2/2015 | Hurri et al. | |
| 9,467,925 B1 * | 10/2016 | Baroudi | H04L 41/0803 |
| 10,848,402 B1 * | 11/2020 | Haddow | H04L 43/50 |
| 11,252,059 B2 | 2/2022 | Bauan et al. | |
| 11,469,999 B1 * | 10/2022 | Gandhi | H04L 45/70 |
| 2009/0067331 A1 * | 3/2009 | Watsen | H04L 45/655 370/235 |
| 2021/0243099 A1 | 8/2021 | Lad et al. | |
| 2022/0263756 A1 * | 8/2022 | Wang | H04L 67/63 |
| 2023/0179495 A1 | 6/2023 | Cherkas | |

(Continued)

FOREIGN PATENT DOCUMENTS

CN            103984316 A       8/2014

OTHER PUBLICATIONS

"Electricity Maps | Live 24/7 $CO_2$ emissions of electricity consumption", online: https://app.electricitymaps.com/map, accessed Aug. 18, 2023, 1 page.

(Continued)

*Primary Examiner* — Padma Mundur
(74) *Attorney, Agent, or Firm* — BEHMKE INNOVATION GROUP LLC; James M. Behmke; James J. Wong

(57) ABSTRACT

According to one or more implementations of the disclosure, a device initiates probing of a path in a network during which one or more probe packets are sent along the path. A hop along the path modifies the one or more probe packets to include energy source information regarding one or more energy sources available to that hop. The device receives results of the probing of the path that include the energy source information. The device generates, based on the results of the probing, a visual representation of the path and those one or energy sources available to different hops along the path. The device provides the visual representation of the path to a user interface for display.

20 Claims, 9 Drawing Sheets

(56) References Cited

U.S. PATENT DOCUMENTS

2023/0401111 A1* 12/2023 Noteboom ......... G06Q 10/0631

OTHER PUBLICATIONS

"California ISO—Supply, Today's Outlook", online: www.caiso.com/TodaysOutlook/Pages/supply.html, accessed Aug. 18, 2023, 4 pages.

Brockners, et al., "Data Fields for In Situ Operations, Administration, and Maintenance (IOAM)", RFC 9197, May 2022, 40 pages, Internet Engineering Task Force.

* cited by examiner

NETWORK PATH PROBING WITH ENERGY SOURCE IDENTIFICATION

TECHNICAL FIELD

The present disclosure relates generally to computer networks, and, more particularly, to network path probing with energy source identification.

BACKGROUND

Traditionally, path probing has allowed network administrators and route selection mechanisms to assess the performance of the various network paths that are available to a given destination, such as the loss, latency, or jitter along a given path. To do so, path probing entails sending probe packets along the target paths, to record information such as whether the packet reached its destination, how long it took for the packet to traverse the path and/or each hop along the path, etc.

While performance is certainly a consideration when choosing a network path, other factors are also largely ignored, such as the energy source(s) used by the hops along a given path. For instance, one network path may offer slightly better performance than that of another path, but the other path may be more resilient to power outages due to the energy sources used by the networking devices along that path. In another example, there may be a preference to use a network path that relies more heavily on green energy over other paths. Even beyond making routing decision, information regarding the energy source(s) available along a given path could be useful from an administration standpoint, such as identifying points in the network for upgrading. Without having any visibility into the energy sources available, though, these and other decisions would not be possible.

BRIEF DESCRIPTION OF THE DRAWINGS

The implementations herein may be better understood by referring to the following description in conjunction with the accompanying drawings in which like reference numerals indicate identically or functionally similar elements, of which.

DESCRIPTION OF EXAMPLE IMPLEMENTATIONS

Overview

Figure 1A:
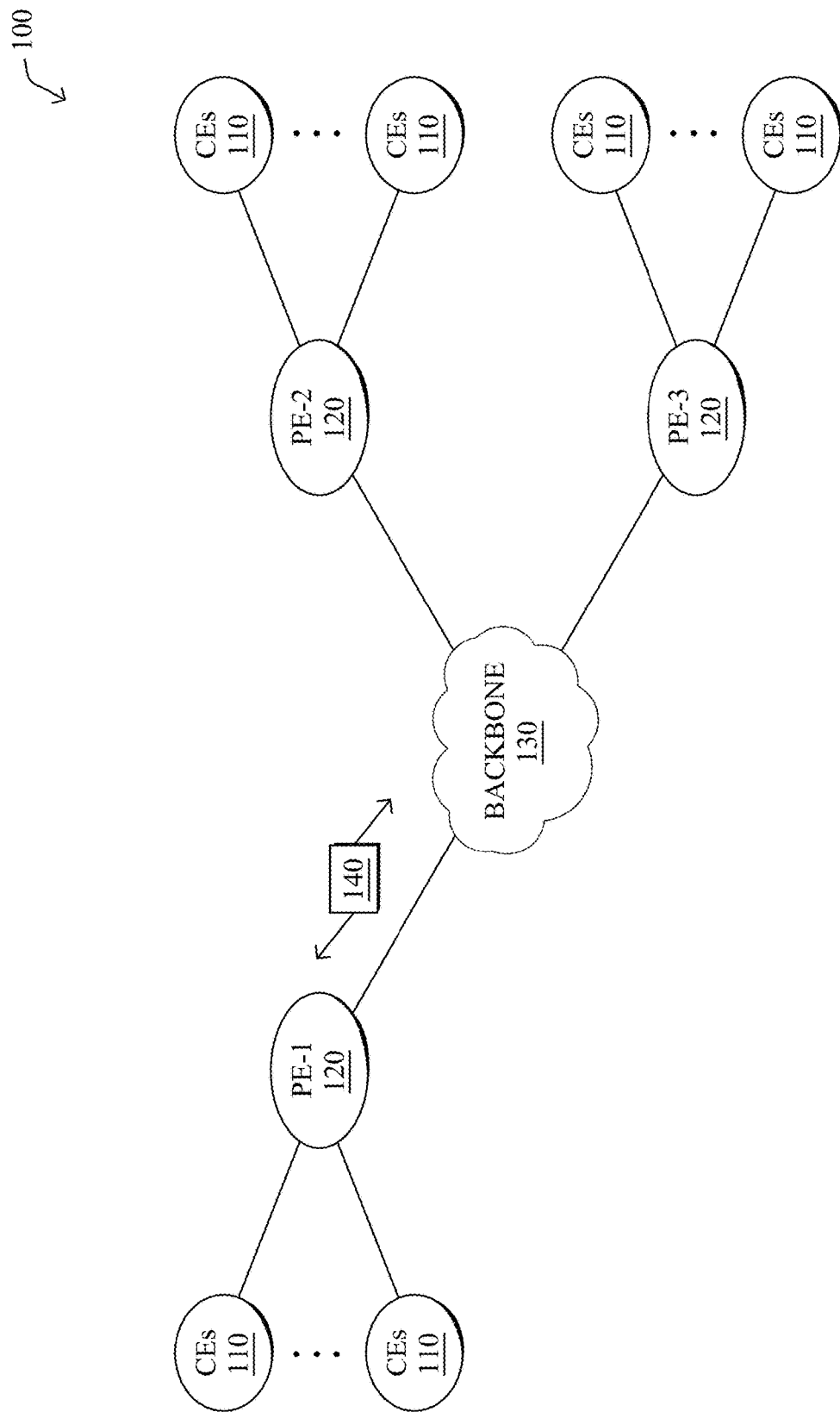
FIGS. 1A-1B illustrate an example communication network.

According to one or more implementations of the disclosure, a device initiates probing of a path in a network during which one or more probe packets are sent along the path. A hop along the path modifies the one or more probe packets to include energy source information regarding one or more energy sources available to that hop. The device receives results of the probing of the path that include the energy source information. The device generates, based on the results of the probing, a visual representation of the path and those one or energy sources available to different hops along the path. The device provides the visual representation of the path to a user interface for display.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
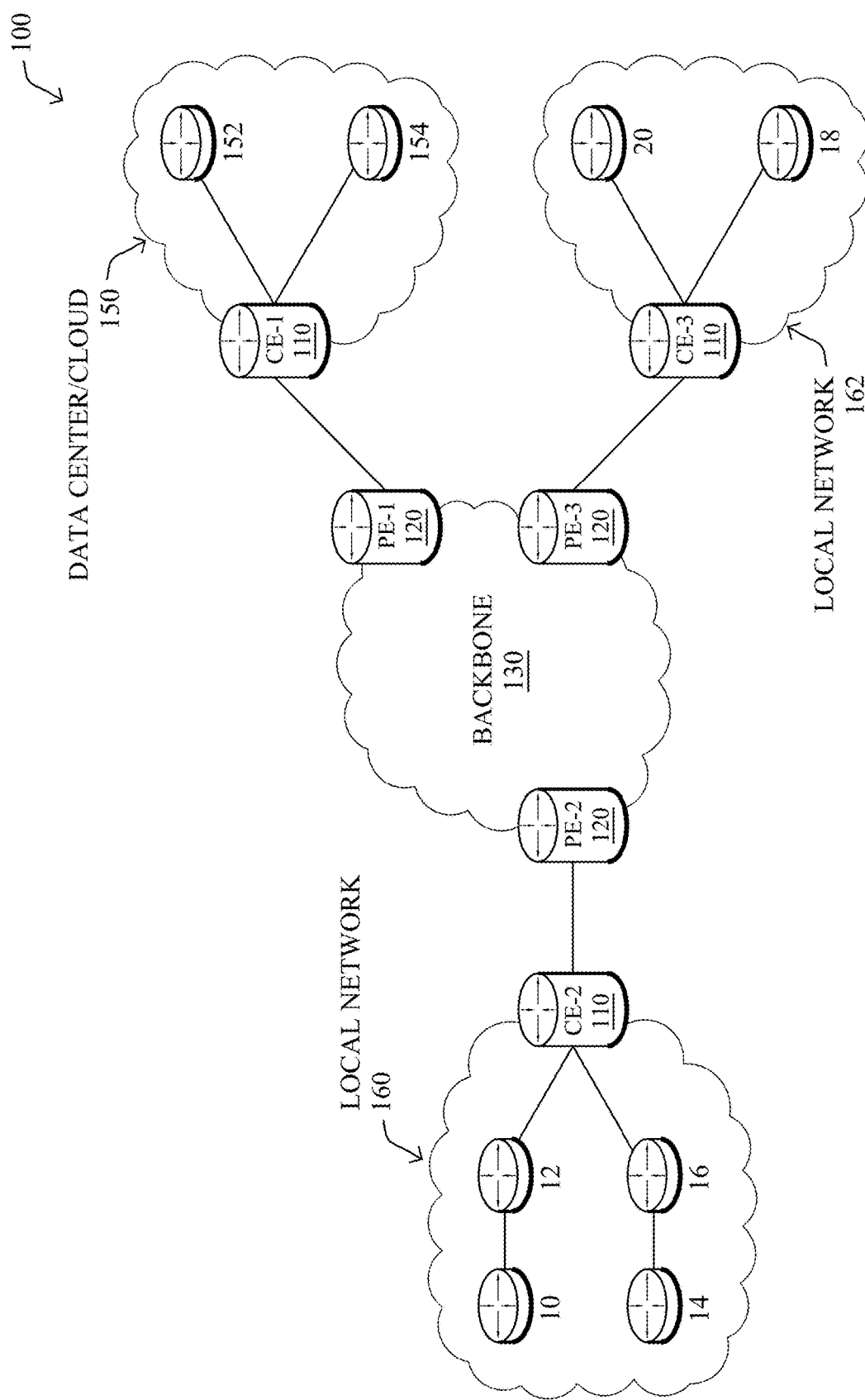

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
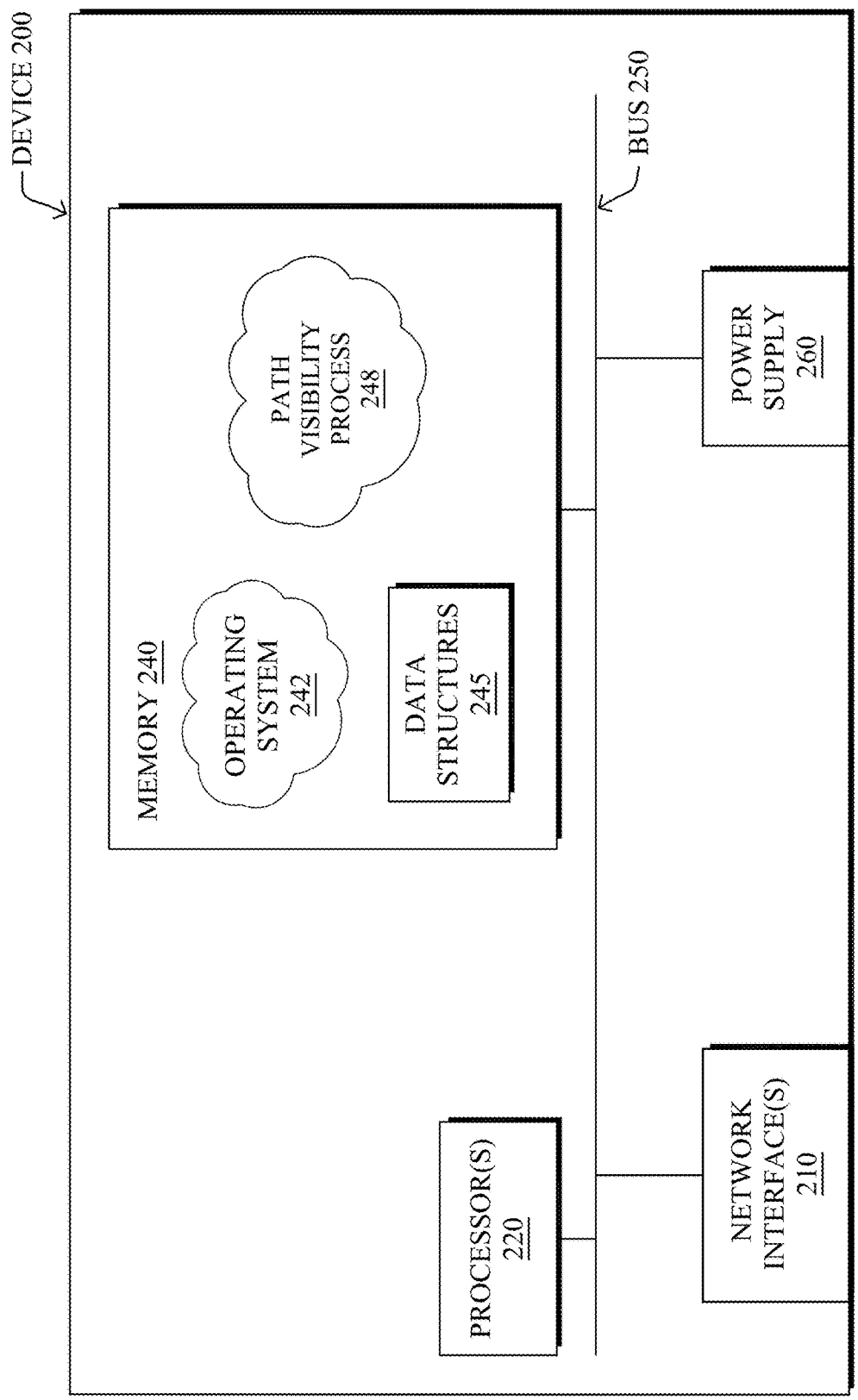
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a path visibility process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, path visibility process 248 may include computer executable instructions executed by the processor 220 to establishing network path visibility using an intelligent network path probing technique and/or to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, path visibility process 248 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, path visibility process 248 may include computer executable instructions that, when executed by processor(s) 220, cause device 200 to perform the techniques described herein. To do so, in some implementations, path visibility process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, path visibility process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that the path visibility process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
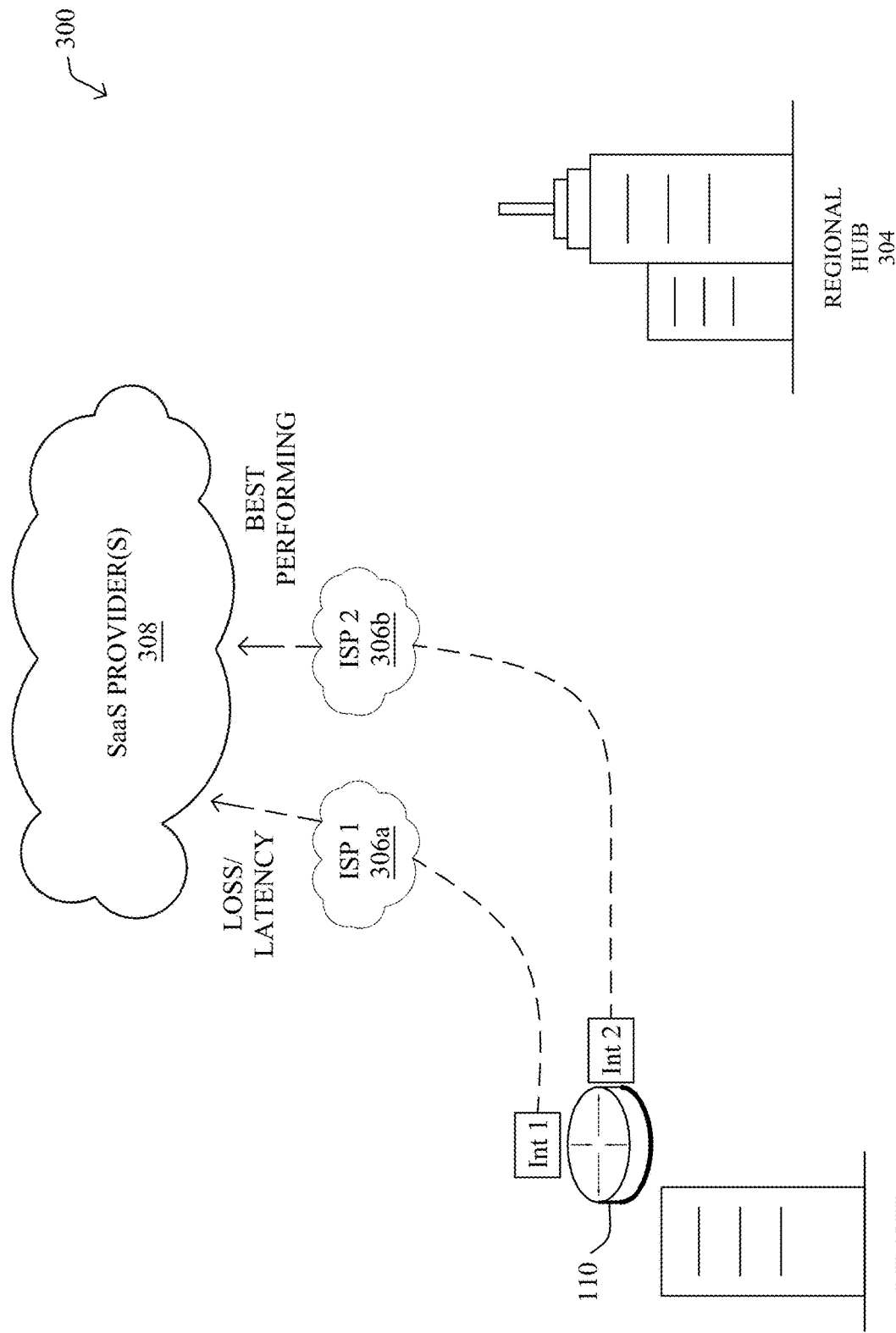
FIGS. 3A-3B illustrate example network deployments.
Figure 3B:
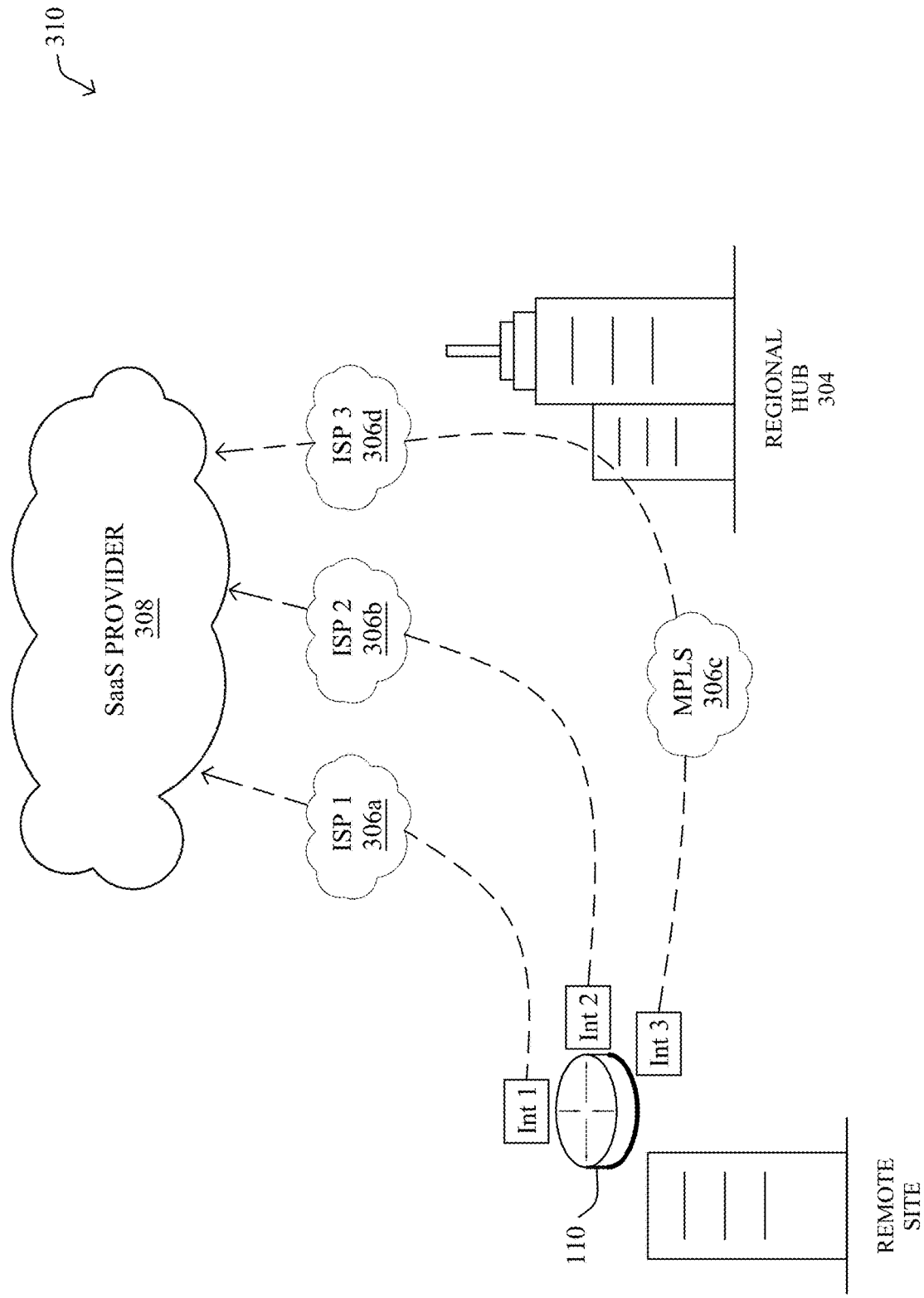

FIGS. 3A-3B illustrate examples of network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

As noted above, service providers, and enterprises that operate or depend on IP/Internet based networks for critical business need to understand both the paths that their network traffic takes and the performance of those paths. Ideally, network path performance data should identify as many specific IP hops (routers) as possible in the path, and the performance impact of each of those hops/segments on the overall end-to-end performance of a given network connection.

Generally, synthetic network probing techniques are utilized to identify network paths. These techniques generate network traffic from a source to a destination using the same traffic characteristics as the application/services whose performance is sought to be understood. In addition, traceroute-style algorithms may be used to achieve these insights by leveraging the IP packet time to live (TTL) header and TTL Expired Internet Control Message Protocol (ICMP) responses from routers to build hop-by-hop representations of the paths taken by those same synthetic probe packets. In this way, the measured performance of these synthetic packets and the network paths is often assumed to be an accurate approximation of the actual performance and path of the corresponding applications/services.

Figure 4:
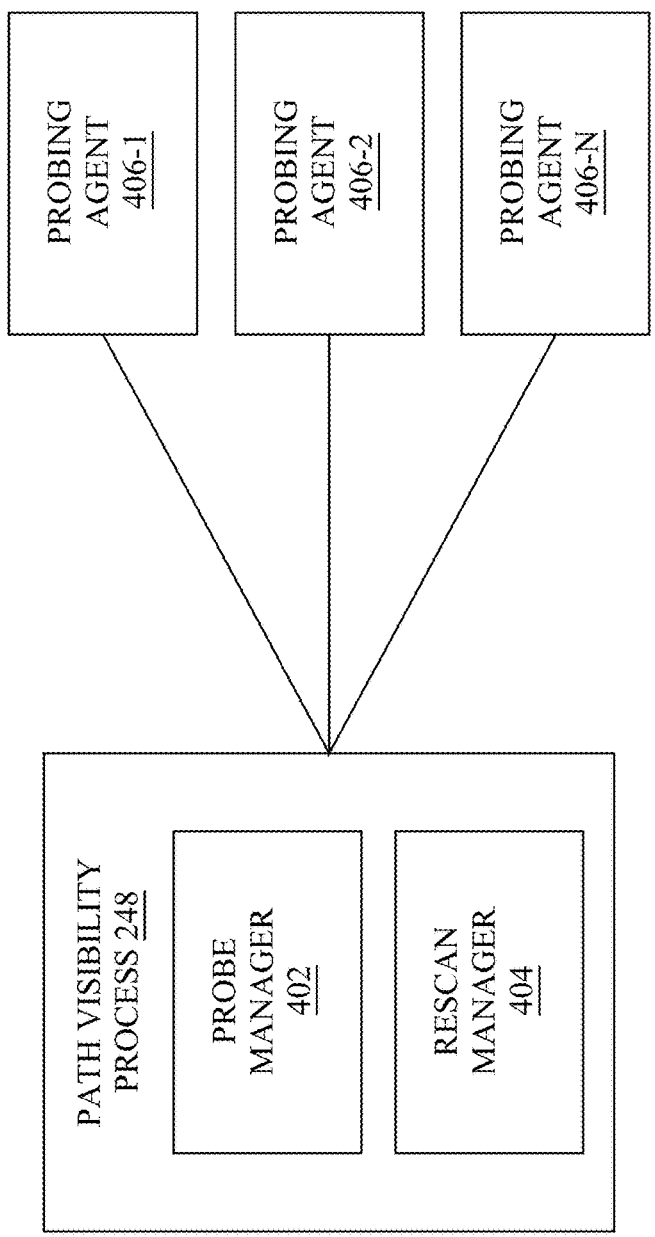
FIG. 4 illustrates an example of an architecture of a probing system for intelligent network path probing.

By way of example, FIG. 4 illustrates an example of an architecture 400 of a (synthetic) probing system for intelligent network path probing, according to various implementations. At the core of architecture 400 is path visibility process 248, which may be executed by one or more devices that participate in network path probing, network path data and/or performance metric collection, network routing, a network supervisory service, a network infrastructure monitoring/mapping service, an application delivery troubleshooting service, etc. In various implementations, path visibility process 248 may include instructions executable as part of or in collaboration with a network monitoring SaaS platform which may configure synthetic network path probe protocols and/or configurations, cause a path probing service in the network comprising one or more probing agent 406 (406-1 . . . 406-N) to generate and/or send those synthetic probes, and/or collect and analyze the data returned by those synthetic probes.

As shown, path visibility process 248 may include probe manager 402 and rescan manager 404. As would be appreciated, the functionalities of these components may be combined or omitted, as desired. In addition, these components may be implemented on a singular device or in a distributed manner, in which case the combination of executing device can be viewed as their own singular device for the purposes of executing path visibility process 248.

During execution of path visibility process 248, probe manager 402 may intelligently select one or more synthetic probe protocols and/or configurations to be used for each probing agent 406 to probe a network path between a particular source-destination pair. Each probing agent 406 may be assigned its own synthetic probe protocol and/or configuration to execute. This may mean that, in some instances, different probing agents receive different probe protocol and/or configuration assignments from one another.

Probe manager 402 may select a synthetic probe protocol and/or configuration to be used by each probing agent 406 to synthetically probe the path between the source and the destination from among probing options available to the synthetic probing system. The probing options may include different types of packets that can be used by available probing agents to perform path probing between the source and the destination. Some examples may include TCP packets, ICMP packets, UDP packets, IGRP packets, other types of packets, etc. In addition, the probing options may include various configurations that may be applied to those packets under different options (e.g., DSCP markings, etc.). Probe manager 402 may select a portion of and/or all of the synthetic probe protocols and/or configurations available to the synthetic probing system for use by the agents in order to generate multiple diverse perspectives that can be collectively used generate a complete view of the network path.

Once the probe manager 402 has selected the set of synthetic probe protocols and/or configurations that will be used by the probing agent, it will then send each probing agent its respective synthetic probe protocol and/or configuration assignment to perform the initial pre-probe scan. Probe manager 402 may receive the results (e.g., path trace data, etc.) of the probing by each of the probing agents. The probe manager 402 may intelligently combine the probe data from each of the probing agents so that the data from some of the probes can supplement missing data from other probes and the combination minimizes the number of non-responding nodes, provides the most complete and accurate path representation for the path between the source and destination, and/or minimizes the impact of processing delays is reduced.

During execution of path visibility process 248, rescan manager 404 may be responsible for initiating re-scanning/probing of a given path, according to any number of conditions. For example, the probe rescan may be triggered in response to detecting a deterioration in the ability of the existing probes to provide complete and accurate network insights for a path. In some implementations, rescan manager 404 may utilize intelligent automation to detect changes in the network that warrant performing a rescan of probing methods. Detecting the changes in the network may be accomplished by analyzing network and/or application metrics collected from the probes monitoring the network path. For example, the network changes may be detected by comparing the collected network metrics to threshold levels, analyzing the network metrics for trends, detecting changes from prior network metrics, etc. Any comparison threshold used to detect changes and/or its significance may be learned (e.g., using ML techniques, etc.) based on historical probing data and/or path trace results. Rescan manager 404 may analyze the detected changes to determine if they will impact and/or degrade path visibility.

For example, if a particular synthetic network probe has been running from source A to destination B and consistently measuring ten network hops, then suddenly changes to five network hops, rescan manager 404 may detect this change. Rescan manager 404 may determine (e.g., based on comparison with a learned threshold, based on comparison with a default threshold, etc.) that this change signifies a configuration change in the network and/or is of significant enough magnitude to warrant a path rescan to determine if there is a new combination of alternate probing methods that could be used to improve network path visibility for that path going forward.

In further implementations, rescan manager 404 may initiate re-scanning/probing of a given path periodically, in response to a request to do so, or when any other such defined conditions are met. These parameters may also be configurable, in some instances, such as via a user interface operated by an administrator.

As noted above, though, one key piece of information that is missing from modern path probing and visualization systems relates to the type(s) of energy sources used by any given hop along a path. For instance, one network path may offer slightly better performance than that of another path, but the other path may be more resilient to power outages due to the energy sources used by the networking devices along that path. In another example, there may be a preference to use a network path that relies more heavily on green energy over other paths. Even beyond making routing decision, information regarding the energy source(s) available along a given path could be useful from an administration standpoint, such as identifying points in the network for upgrading. Without having any visibility into the energy sources available, though, these and other decisions would not be possible.

—Network Path Probing with Energy Source Identification—

The techniques introduced herein allow for the enhancement of network path probing and visualization systems to collect and report on the energy source(s) that power the various hops along a network path. In some aspects, information regarding the energy source(s) for a given hop may be conveyed via path probes sent along the path.

Illustratively, the techniques described herein may be performed by hardware, software, and/or firmware, such as in accordance with the path visibility process 248, which may include computer executable instructions executed by the processor 220 (or independent processor of interfaces 210) to perform functions relating to the techniques described herein.

Specifically, according to one or more implementations of the disclosure as described in detail below, a device initiates probing of a path in a network during which one or more probe packets are sent along the path. A hop along the path modifies the one or more probe packets to include energy source information regarding one or more energy sources available to that hop. The device receives results of the probing of the path that include the energy source information. The device generates, based on the results of the probing, a visual representation of the path and those one or energy sources available to different hops along the path. The device provides the visual representation of the path to a user interface for display.

Operationally, the techniques herein propose enhancing routers, switches, and/or other networking equipment along a network path to be configured with the knowledge of its energy source(s). In some implementations, any such hop may be configured to access an application programming interface (API) of a $3^{rd}$ party website or service, such as electricitymaps.com, which collects and exposes historical carbon emissions from power generation around the world. In other cases, the hop may access an API of the electric grid itself, to garner information about its energy source(s) (e.g., http://www.caiso.com/TodaysOutlook/Pages/supply.html). Note that the energy source can vary throughout the day and the hop may repeatedly query its energy source information, such as periodically or on demand, so as to ensure that its energy source information is up to date. In another implementation, a network administrator can upload historic and/or forecasted energy source information to the networking equipment such as obtained from the energy grid or another source.

Figure 5:
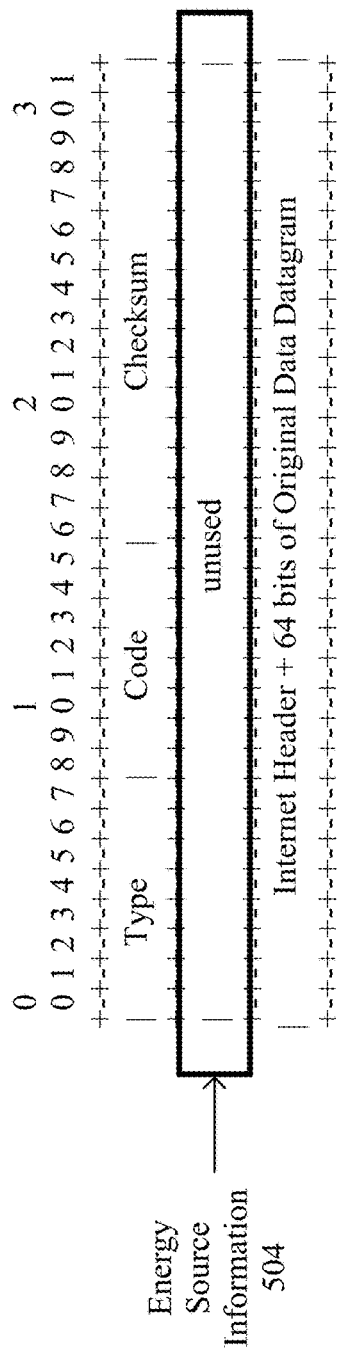
FIG. 5 illustrates an example of energy source information being inserted into a probe packet.

FIG. 5 illustrates an example 500 of energy source information being inserted into a probe packet, in various implementations. In various implementations, the probe packets sent along a path may take the form of IP time-to-live (TTL) header expiry messages, such as Internet Control Message Protocol (ICMP) TTL expiry or Transmission Control Protocol (TCP) SYN-ACK TTL expiry messages. In turn, when a given hop along the probed path receives such a message, it may augment it by inserting its own energy source information into the packet before sending it onward.

As shown, for instance, consider the case in which a hop/networking equipment along a network path receives an ICMP TTL message 502. As would be appreciated, such a message may include various fields such as Type, Code, and Checksum, in accordance with the ICMP protocol.

In various implementations, the hop may insert its energy source information 504 into the "unused" field of ICMP TTL message 502. However, other ICMP/IP fields are not touched. For example, ICMP Fields (Type/Code) for TTL expiry continue to be the same, such as: Type: 11; Code: 0 time to live exceeded in transit; or the like.

In some implementations, energy source information 504 may take the form of a binary or other value that represents a specific set of information regarding its energy source(s). For instance, in a simplistic implementation, the hop may insert a binary value into ICMP TTL message 502 of '1' to indicate that its energy source is a renewable energy source or '0' if it is not (e.g., in the most significant bit position). In a further implementation, the hop may include in one or more bits a percentage of renewable/non-renewable mix of its energy source(s). Of course, in some embodiments, more detailed its energy source information 504 could also be inserted, such as, but not limited to, data indicative of the specific sources of energy (e.g., solar, wind, coal, gas, etc.).

In various embodiments, the source probing agent may collect the responses from all of the hops in the path and their reported energy source information. When multiple paths are available to a given destination, the probing results may also indicate the various paths available.

In some instances, when a given hop fails to report its energy source information, the agent may identify the geo-location of that hop (e.g., latitude and longitude coordinates, etc.) and use this information to perform a lookup of the energy source information for that hop. For instance, the geolocation of the hop can be identified based on its IP address and then its energy source information retrieved via an API with its energy supplier or from a $3^{rd}$ party source.

Figure 6:
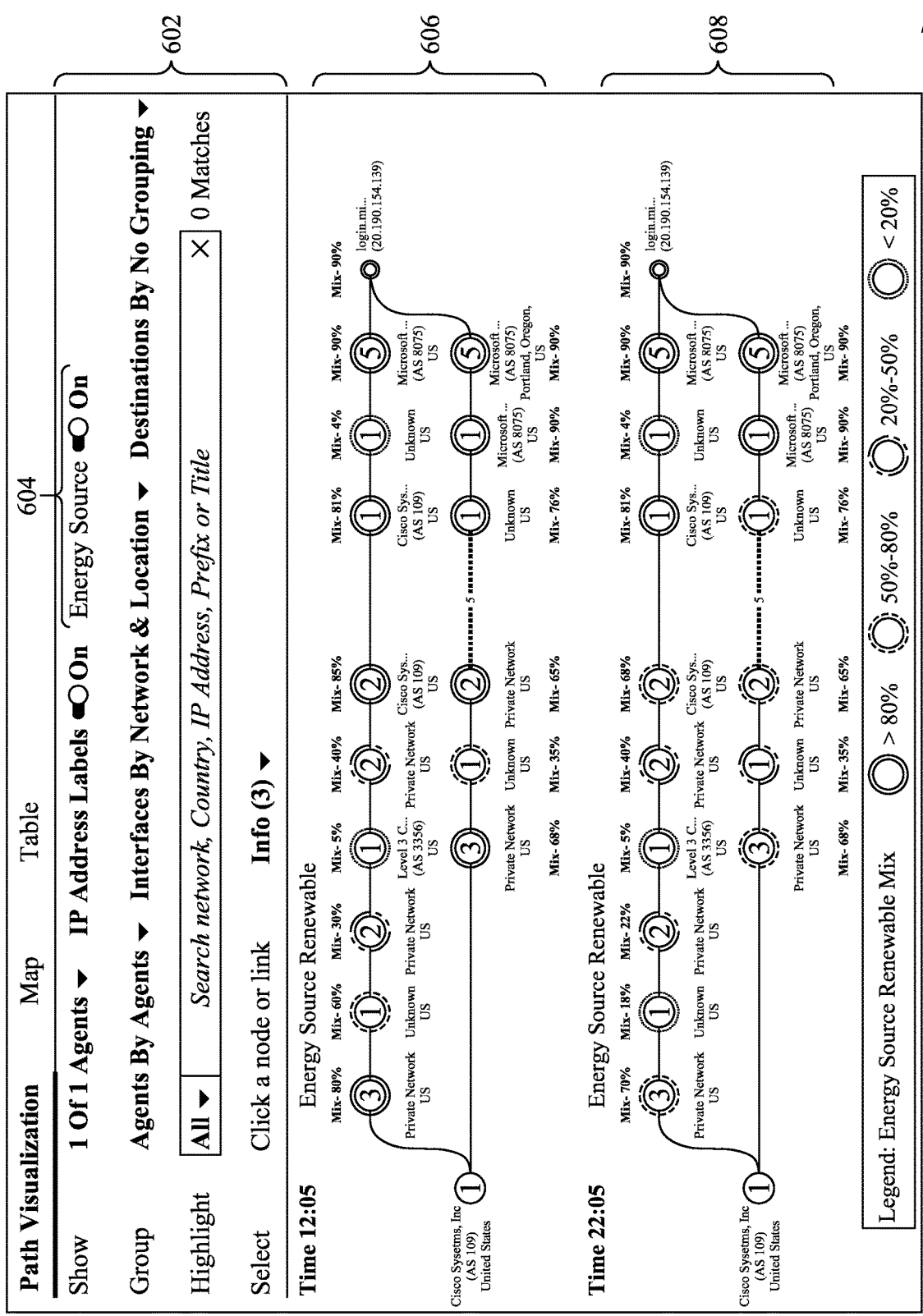
FIG. 6 illustrates an example visualization of a path with energy source information.

In various implementations, the system may then assess the probing results to generate a visualization of the path that includes the energy source information for the path and/or on a hop-by-hop basis. For instance, FIG. 6 illustrates an example visualization 600 of a path with energy source information. As shown, visualization 600 may include various input controls 602 that control the information displayed to a user. For instance, input controls 602 may allow the user to specify whether the results are to be aggregated across probing agents or from a singular agent, the IP addresses of the hops should be shown, how the paths are to be displayed, and the like. In some implementations, controls 602 may also include an option 604 that allows the user to enable or disable the display of energy source information for the path.

When option 604 is enabled, visualization 600 may display a representation of one or more paths between a given source and destination in the network, such as representation 606. In some cases, representation 606 may also include an indication as to when the probing was conducted, so as to notify the user as to when the indicated energy sources were in use by the various hops. For each hop, the visualization of the hop may also include some form of indicia that conveys the energy source information for that hop. For instance, in one implementation, visualization 600 may display the percentage mix of renewable to non-renewable energy consumed by any given hop. This can be done, for example, using various colorations, shadings, or the like, to represent different range of percentages (e.g., red to indicate <20% renewable energy, etc.).

As the energy source information can also change for any given hop over time, in some cases, visualization 600 may also display multiple representations of the path(s) between two points in the network. For instance, visualization 600 may also display representation 608 that was generated based on the re-probing of the path at a later time. Thus, the user may note that a given hop along one of the paths went from using an acceptable mix of renewable energy to using a significantly reduced mix over time.

Based on the displayed information, the user may opt to select one of the paths to convey certain traffic, flag certain hops for upgrading or other configuration changes, or the like. In further instances, the energy source information for the path may also be conveyed to a routing engine, allowing it to automatically select which path to use, based on its energy source(s).

Figure 7:
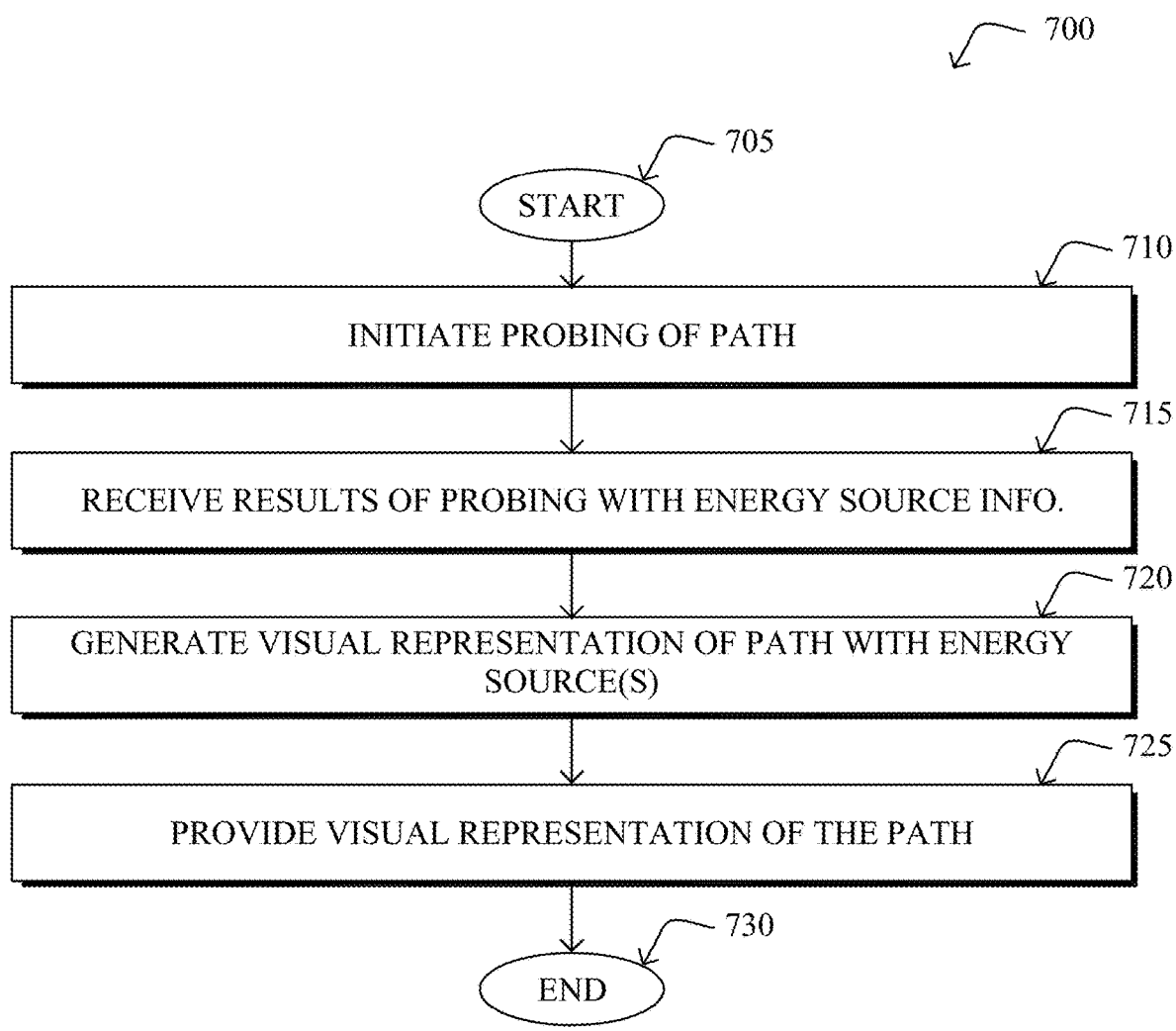
FIG. 7 illustrates an example simplified procedure for network path probing with energy source identification.

FIG. 7 illustrates an example simplified procedure for network path probing with energy source identification, in accordance with one or more implementations described herein. For example, a non-generic, specifically configured device (e.g., device 200) may perform procedure 700 by executing stored instructions (e.g., path visibility process 248). The procedure 700 may start at step 705, and continues to step 710 where, as described in greater detail above, the device may initiate probing of a path in a network during which one or more probe packets are sent along the path. In various implementations, a hop along the path modifies the one or more probe packets to include energy source information regarding one or more energy sources available to that hop. In some implementations, the device may do so by instructing one or more probing agents in the network to send the one or more probe packets along the path. In various instances, the hop along the path obtains the energy source information for inclusion in the one or more probe packets via an application programming interface (API).

At step 715, as detailed above, the device may receive results of the probing of the path that include the energy source information. In some instances, the hop along the path modifies the one or more probe packets by inserting the energy source information into a time-to-live (TTL) expiry message. In one implementation, the one or more probe packets are Internet Control Message Protocol (ICMP) packets. In another implementation, the one or more probe packets are Transmission Control Protocol (TCP) packets. In some cases, the device causes traffic to be routed along the path in the network based in part on the one or energy sources available to different hops along the path.

At step 720, the device may generate, based on the results of the probing, a visual representation of the path and those one or energy sources available to different hops along the path, as described in greater detail above. In some implementations, the visual representation indicates a percentage of energy consumed by the hop that was sourced from one or more renewable energy sources. In another implementation, the visual representation of the path includes geolocation information for its hops.

At step 725, as detailed above, the device may provide the visual representation of the path to a user interface for display. In some instances, the device may also repeat the probing of the path at a different time to capture additional energy source information, wherein the visual representation of the path further indicates change in which energy sources the hop uses over time, based on a difference between the energy source information and the additional energy source information.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for network path probing with energy source identification, it is to be understood that various other adaptations and modifications may be made within the spirit and scope of the implementations herein. For example, while certain implementations are described herein with respect to using certain types of probe protocols and configurations in pre-probe scan and rescan operations, the probes and their usage is not limited as such and may include other protocols and configurations that can be used for other functions, in other implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

What is claimed is:

1. A method, comprising:
   initiating, by a device, probing of a path in a network during which one or more probe packets are sent along the path, wherein a hop along the path modifies the one or more probe packets to include energy source information indicative of a type of energy source regarding one or more energy sources available to that hop;
   receiving, at the device, results of the probing of the path that include the energy source information;
   generating, by the device and based on the results of the probing, a visual representation of the path and those one or more energy sources available to different hops along the path; and
   providing, by the device, the visual representation of the path to a user interface for display.

2. The method of claim 1, wherein initiating probing of the path comprises:
   instructing one or more probing agents in the network to send the one or more probe packets along the path.

3. The method of claim 1, wherein the hop along the path obtains the energy source information for inclusion in the one or more probe packets via an application programming interface (API).

4. The method of claim 1, further comprising:
   repeating the probing of the path at a different time to capture additional energy source information, wherein the visual representation of the path further indicates change in which energy sources the hop uses over time, based on a difference between the energy source information and the additional energy source information.

5. The method of claim 1, wherein the hop along the path modifies the one or more probe packets by inserting the energy source information into a time-to-live (TTL) expiry message.

6. The method of claim 5, wherein the one or more probe packets are Internet Control Message Protocol (ICMP) packets.

7. The method of claim 5, wherein the one or more probe packets are Transmission Control Protocol (TCP) packets.

8. The method of claim 1, wherein the visual representation indicates a percentage of energy consumed by the hop that was sourced from one or more renewable energy sources.

9. The method of claim 1, wherein the visual representation of the path includes geolocation information for its hops.

10. The method of claim 1, further comprising:
    causing traffic to be routed along the path in the network based in part on the one or more energy sources available to different hops along the path.

11. An apparatus, comprising:
    one or more network interfaces;
    a processor coupled to the one or more network interfaces and configured to execute one or more processes; and
    a memory configured to store a process that is executable by the processor, the process when executed configured to:
      initiate probing of a path in a network during which one or more probe packets are sent along the path, wherein a hop along the path modifies the one or more probe packets to include energy source information indicative of a type of energy source regarding one or more energy sources available to that hop;
      receive results of the probing of the path that include the energy source information;
      generate, based on the results of the probing, a visual representation of the path and those one or more energy sources available to different hops along the path; and
      provide the visual representation of the path to a user interface for display.

12. The apparatus of claim 11, wherein the apparatus initiates probing of the path by:
    instructing one or more probing agents in the network to send the one or more probe packets along the path.

13. The apparatus of claim 11, wherein the hop along the path obtains the energy source information for inclusion in the one or more probe packets via an application programming interface (API).

14. The apparatus of claim 11, wherein the process when executed is further configured to:
    repeat the probing of the path at a different time to capture additional energy source information, wherein the visual representation of the path further indicates change in which energy sources the hop uses over time, based on a difference between the energy source information and the additional energy source information.

15. The apparatus of claim 11, wherein the hop along the path modifies the one or more probe packets by inserting the energy source information into a time-to-live (TTL) expiry message.

16. The apparatus of claim 15, wherein the one or more probe packets are Internet Control Message Protocol (ICMP) packets.

17. The apparatus of claim 15, wherein the one or more probe packets are Transmission Control Protocol (TCP) packets.

18. The apparatus of claim 11, wherein the visual representation indicates a percentage of energy consumed by the hop that was sourced from one or more renewable energy sources.

19. The apparatus of claim 11, wherein the visual representation of the path includes geolocation information for its hops.

20. A tangible, non-transitory, computer-readable medium storing program instructions that cause a device to execute a process comprising:
   initiating, by the device, probing of a path in a network during which one or more probe packets are sent along the path, wherein a hop along the path modifies the one or more probe packets to include energy source information indicative of a type of energy source regarding one or more energy sources available to that hop;
   receiving, at the device, results of the probing of the path that include the energy source information;
   generating, by the device and based on the results of the probing, a visual representation of the path and those one or more energy sources available to different hops along the path; and
   providing, by the device, the visual representation of the path to a user interface for display.

* * * * *